(12) United States Patent
Fountain et al.

(10) Patent No.: US 12,276,981 B2
(45) Date of Patent: Apr. 15, 2025

(54) TASK-BASED DYNAMIC BONDING NOTIFICATION SYSTEMS AND METHODS

(71) Applicant: ZEBRA TECHNOLOGIES CORPORATION, Lincolnshire, IL (US)

(72) Inventors: Mark Thomas Fountain, Hitchin (GB); Brian Califano, Point Pleasant, NJ (US)

(73) Assignee: Zebra Technologies Corporation, Lincolnshire, IL (US)

( * ) Notice: Subject to any disclaimer, the term of this patent is extended or adjusted under 35 U.S.C. 154(b) by 285 days.

(21) Appl. No.: 17/538,806

(22) Filed: Nov. 30, 2021

(65) Prior Publication Data

US 2023/0168673 A1    Jun. 1, 2023

(51) Int. Cl.
| | |
|---|---|
| *G05D 1/00* | (2024.01) |
| *B64C 39/02* | (2023.01) |
| *B65G 1/04* | (2006.01) |
| *B65G 1/137* | (2006.01) |
| *G06Q 10/08* | (2023.01) |
| *G06Q 10/087* | (2023.01) |

(52) U.S. Cl.
CPC ......... *G05D 1/0088* (2013.01); *B64C 39/024* (2013.01); *B65G 1/0492* (2013.01); *B65G 1/1373* (2013.01); *G05D 1/0225* (2013.01); *G06Q 10/08* (2013.01); *G06Q 10/087* (2013.01)

(58) Field of Classification Search
CPC .................................................... G05D 1/0088
See application file for complete search history.

(56) References Cited

U.S. PATENT DOCUMENTS

| | | | | |
|---|---|---|---|---|
| 2022/0411188 | A1* | 12/2022 | King | B65G 1/1375 |
| 2023/0168673 | A1* | 6/2023 | Fountain | B65G 1/1373 |
| | | | | 701/23 |
| 2023/0194331 | A1* | 6/2023 | Fountain | G01G 19/42 |
| | | | | 177/1 |
| 2023/0324919 | A1* | 10/2023 | Hoy | G05D 1/0088 |
| | | | | 701/23 |

* cited by examiner

*Primary Examiner* — Michael A Berns

(57) ABSTRACT

A method includes: detecting a transporter allocation trigger associated with a mobile computing device disposed in a facility; in response to detecting the transporter allocation trigger, selecting a transporter identifier of an autonomous transporter disposed in the facility; selecting a joint notification parameter; causing the mobile computing device to generate a notification according to the joint notification parameter; and transmitting the joint notification parameter to the autonomous transporter, to cause the autonomous transporter to generate a visual notification corresponding to the notification.

20 Claims, 9 Drawing Sheets

TASK-BASED DYNAMIC BONDING NOTIFICATION SYSTEMS AND METHODS

BACKGROUND

Some facilities, such as warehouses, may employ autonomous transporters or other mechanized devices to transport items retrieved from shelves by workers in the facilities. The facilities may contain significant numbers of both workers and transporters, which may impede the location of appropriate transporters by workers.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
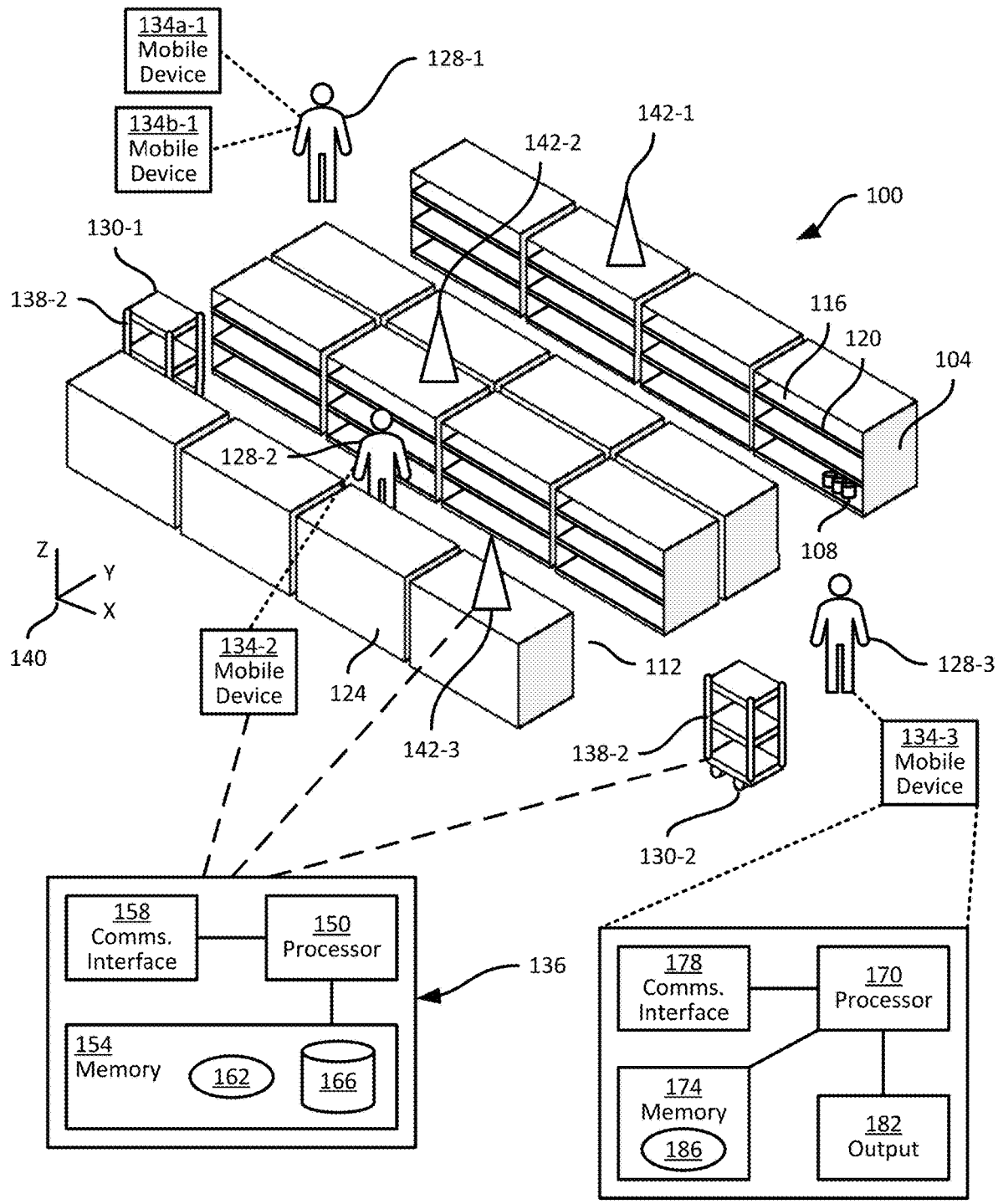
FIG. 1 is a diagram of a task-based dynamic bonding system deployed in a facility.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method comprising: detecting a transporter allocation trigger associated with a mobile computing device disposed in a facility; in response to detecting the transporter allocation trigger, selecting a transporter identifier of an autonomous transporter disposed in the facility; selecting a joint notification parameter; causing the mobile computing device to generate a notification according to the joint notification parameter; and transmitting the joint notification parameter to the autonomous transporter, to cause the autonomous transporter to generate a visual notification corresponding to the notification.

Additional examples disclosed herein are directed to a server, comprising: a communications interface, and a processor connected with the communications interface, the processor configured to: detect a transporter allocation trigger associated with a mobile computing device disposed in a facility; in response to detecting the transporter allocation trigger, select a transporter identifier of an autonomous transporter disposed in the facility; select a joint notification parameter; transmit the joint notification parameter to the mobile computing device, to cause the mobile computing device to generate a first visual notification according to the joint notification parameter; and transmit the joint notification parameter to the transporter, to cause the transporter to generate a second visual notification synchronized with the first visual notification, according to the joint notification parameter.

Further examples disclosed herein are directed to a mobile computing device, comprising: an output assembly; a communications interface; and a processor connected with the output assembly and the communications interface, the processor configured to: detect a transporter allocation trigger; in response to detecting the transporter allocation trigger, select a transporter identifier of an autonomous transporter disposed in a facility; select a joint notification parameter; generate a notification according to the joint notification parameter; and transmit the joint notification parameter to the transporter, to cause the transporter to generate a visual notification corresponding to the notification.

FIG. 1 illustrates a task-based dynamic bonding system 100 deployed in an interior of a facility, such as a warehouse, a manufacturing facility, or the like. The facility includes a plurality of support structures 104 carrying items 108. In the illustrated example, the support structures 104 include shelf modules, e.g., arranged in sets forming aisles 112. FIG. 1, specifically, illustrates two aisles 112 each formed by eight shelf modules. The facility can have a wide variety of layouts other than the example layout shown in FIG. 1.

The support structures 104 can include shelf modules, pegboards, bins, and the like, to support the items 108 thereon. As shown in FIG. 1, support structures 104 in the form of shelf modules can include support surfaces 116 terminating in shelf edges 120, which face into the corresponding aisle 112. A shelf edge 120, as will be apparent to those skilled in the art, is a surface bounded by adjacent surfaces having different angles of inclination. In the example illustrated in FIG. 1, each shelf edge 120 is at an angle of about ninety degrees relative to the corresponding support surface 116 above that shelf edge 120 and the underside (not shown) of the support surface 116. In other examples, the angles between a shelf edge 120 and adjacent surfaces is more or less than ninety degrees.

The support surfaces 116 are accessible from the aisles 112 into which the shelf edges 120 face. In some examples, each support structure 104 has a back wall 124 rendering the support surfaces 116 inaccessible from the opposite side of the module. In other examples, however, the support structures 104 can be open from both sides (e.g., the back wall 124 can be omitted).

The support surfaces 116 carry the items 108, which can include any of a wide variety of objects, such as products, packages, and the like. The items 108 may be received at the facility and placed on the support structures 104 for storage.

Later, the items 108 may be retrieved from the support structures 104, e.g., for consumption in a manufacturing process, for shipment from the facility, or the like.

Retrieval of the items 108 from the support structures 104 can be accomplished by workers 128, also referred to as users 128. Three users 128-1, 128-2, and 128-3 (collectively referred to herein as users 128, and generically referred to as a user 128; similar nomenclature is also used for other elements discussed herein) are shown in FIG. 1, but it is contemplated that the number of users 128 deployed in the facility may vary over time, and may be dependent on the size of the facility, the nature of the items 108, and the like. Transportation of the items 108 between the support structures 104 and other portions of the facility, such as shipping areas for outbound items 108 that have been retrieved from the support structures 104 (i.e., picked), is performed at least in part by autonomous transporters 130.

FIG. 1 includes two example transporters 130-1, and 130-2, although it will be understood that greater numbers of transporters 130 can be employed in other implementations, for example based on the size and/or layout of the facility. The transporters 130, which may also be referred to as collaborative robots or "cobots", each include a movable chassis, e.g., with a locomotive assembly such as wheels, tracks or the like driven by an electric motor. The chassis supports one or more bins, shelves or the like, configured to hold items 108. Each transporter 130 also includes navigational components enabling semi-autonomous or autonomous navigation within the facility.

To transport an item 108 from a support structure 104, e.g., to ship the item 108 from the facility to another facility, to a customer, or the like, a user 128 may be instructed to travel to the support structure 104 carrying the relevant item 108. The user 128 may then retrieve the relevant item 108 from the support structure 104. Once the item 108 is retrieved, the user 128 places the item 108 onto a transporter 130, for subsequent transport to another portion of the facility, such as a shipping area.

The users 128 and transporters 130, however, are not bonded persistently. That is, a given user 128 does not necessarily deposit all the items 108 they retrieve from the support structures 104 onto the same transporter 130. Instead, the items 108 may be deposited to different transporters 130, depending on the locations of the user 128 and the transporters 130, the intended destination of the items 108, and the like.

As will be apparent, each transporter 130 can be configured to carry a plurality of items 108 simultaneously, such items 108 having been transferred to the transporter 130 from the support structures 104 by various different users 128. In other words, users 128 and transporters 130 are not bound persistently. Instead, a user 128 and a transporter 130 may be associated with one another only for a given task (e.g., to transfer a particular item 108 from a support structure 104 to the transporter 130), and each of the user 128 and the transporter 130 may subsequently be bound with other transporters 130 or users 128 for the completion of other tasks.

Instructions identifying items 108 to be picked, and associated information such as the locations of those items 108, can be provided to the users 128 as instructions transmitted to mobile computing devices 134 from a server 136 or other central computing device. The system 100 thus includes a mobile computing device 134 associated with each user. As illustrated, the user 128-2 is associated with (e.g., carries, wears, or the like) a device 134-2, and the user 128-3 is associated with a device 134-3. The devices 134 can include tablet computers, smart phones, wearable computers such as wrist-mounted computers, smart watches, smart glasses, or the like. In some examples, a user 128 can be equipped with physically distinct devices that cooperate to implement the functionality of a device 134 described herein. For example, the user 128-1 is illustrated as having a first device 134a-1, such as a wrist-mounted computer, and a second device 134b-1, such as a heads-up display integrated with a pair of glasses, or the like. In such examples, the second device 134b-1 can display information received from the first device 134a-1.

The users 128 can also be provided with instructions, via the associated devices 134, identifying particular transporters 130 to which items 108 retrieved from the support structures 104 are to be deposited. However, the system 100 may include a great enough number of transporters 130 (e.g., hundreds in a large facility) that several distinct transporters 130 are visible to a user 128 at a given time. Thus, even with an instruction presented to the user 128 via the corresponding device 134, such as an identifier corresponding to a nameplate on the relevant transporter 130, the user 128 may have difficulty in distinguishing the correct transporter 130 from the other transporters 130 in the vicinity of the user 128.

The system 100 therefore enables both the devices 134 and the transporters 130 to generate synchronized visual notifications, facilitating the visual identification of a dynamically allocated transporter 130 by a user 128.

In particular, the devices 134 include output assemblies such as displays, indicator lights, or the like, controllable to produce visual notifications. The devices 134 also include respective controllers and communications interfaces enabling the devices 134 to receive instructions for generating the visual notifications, e.g. from the server 136, and to generate such notifications via control of the above-mentioned output assemblies.

The transporters 130 can include communication interfaces (e.g., Wi-Fi interfaces or the like) enabling the transporters 130 to receive instructions, e.g., from the server 136, for generating visual notifications. The transporters 130 also include output assemblies, such as indicator light strips 138-1, 138-2. The light strips 138, e.g., addressable LED strips, can be mounted to the chassis of each transporter 130. For example, as illustrated in FIG. 1 each transporter 130 includes a light strip 138 along the height of the transporter at each of four corners of the chassis. A variety of other output assemblies are also contemplated for the transporters 130. For example, the transporters can include display panels in addition to, or instead of, the light strips 138. Such displays can also be controlled to generate visual notifications as discussed below.

As will be discussed in greater detail below, the system 100 enables the displays (or other suitable output assemblies) of the devices 134 and the light strips 138 (or other suitable output assemblies) of the transporters 130 to be controlled in a synchronized manner to generate matching visual notifications. The visual notifications enable a user 128 to readily distinguish the appropriate transporter 130 (i.e., the transporter 130 that has been dynamically bonded to the user 128 for a particular pick task) from other transporters 130 in the field of view of the user 128.

The server 136 mentioned above can allocate a transporter 130 to a user 128 for a particular pick task, and communicate the allocation to the relevant device 134 and transporter 130, along with at least one joint notification parameter. The joint notification parameter is employed by both the device 134 and the transporter 130 to generate, simultaneously, a visual notification (e.g., generating illumination in a particular color, flashing pattern, or the like).

The server 136 can perform such allocation based on locations of the devices 134 (which are employed as proxies for the locations of the corresponding users 128) and locations of the transporters 130 in a coordinate system 140 established in the facility. For example, the system 100 can include a location tracking subsystem enabling periodic retrieval of device 134 and transporter 130 locations by the server 136.

The location tracking subsystem can include, for example, wireless emitters 142 deployed throughout the facility, such as wireless network access points, beacons (e.g., Bluetooth beacons), radio frequency identification (RFID) readers, and the like. In other examples, the location tracking subsystem can include cameras or other sensors configured to detect the devices 134 and/or transporters 130, e.g., from video streams captured by the cameras. The devices 134 and the transporters 130 can be configured to determine their locations in the coordinate system 140 based on signal strength measurements and/or other parameters determined from signals generated by the emitters 142. The devices 134 and the transporters 130 can then report the determined locations to the server 136. In other examples, the emitters 142 can cooperate to determine and report the locations of transporters 130 and/or devices 134 to the server (e.g., in the case of emitters 142 that include RFID readers). In further examples, the devices 134 and/or the transporters 130 can include motion sensors, such as inertial measurement units (IMUs), odometers (in the case of the transporters 130) or the like to assist in determining and reporting locations.

The server 136 can also maintain a set of the above-mentioned joint notification parameters, and manage the visual notifications generated by transporters 130 and devices 134 to reduce or avoid the generation of identical visual notifications by different pairs of transporter 130 and device 134. Such duplication may be avoided across the entire facility, or across specific regions of the facility, such as the aisles 112.

FIG. 1 also illustrates certain internal components of the server 136. The server 136 includes a special-purpose controller, such as a processor 150, interconnected with a non-transitory computer readable storage medium, such as a memory 154. The memory 154 includes a combination of volatile memory (e.g., Random Access Memory or RAM) and non-volatile memory (e.g., read only memory or ROM, Electrically Erasable Programmable Read Only Memory or EEPROM, flash memory). The processor 150 and the memory 154 each comprise one or more integrated circuits.

The server 136 also includes a communications interface 158 interconnected with the processor 150. The communications interface 158 includes any suitable hardware (e.g., transmitters, receivers, network interface controllers and the like) allowing the server 136 to communicate with other computing devices (e.g., the devices 134 and the transporters 130) via a suitable combination of local and/or wide-area networks. The specific components of the communications interface 158 are selected based on the type(s) of network(s) used by the server 136.

The memory 154 stores computer readable instructions for execution by the processor 150. In particular, the memory 154 stores a task allocation application 162 (also referred to simply as the application 162) which, when executed by the processor 150, configures the processor 150 to allocate transporters 130 to users 128 for the completion of pick tasks, and to select and transmit joint notification parameters to temporarily-bonded transporters 130 and devices 134. The application 162 may also be implemented as a suite of distinct applications in other examples. Those skilled in the art will appreciate that the functionality implemented by the processor 150 via the execution of the application 162 may also be implemented by one or more specially designed hardware and firmware components, such as FPGAs, ASICs and the like in other embodiments.

The system 100 also includes a repository 166 accessible to the server 136. In the present example, the repository 166 is stored in the memory 154, although in other examples the repository 166 can be stored separately from the server 136 and accessed by the server 136 using the communications interface 158. The repository 166 contains current locations of either or both of the devices 134 and the transporters, as well as notification parameters and status information associated with the notification parameters, as will be discussed below. In some examples, the repository 166 can also contain locations of various other elements in the facility, such as the items 108, the support structures 104, and the like. [device can store repository]

Certain internal components of the devices 134 are also shown, in connection with the device 134-3. As will be apparent, each of the devices 134 can include the illustrated components. The device 134-3 includes a processor 170, interconnected with a memory 174, a communications interface 178, and an output assembly 182. The output assembly 182 can include any suitable combination of a display, a speaker, an indicator light, and the like. The memory 174 stores an application 186 that, when executed by the processor 170, configures the device 134 to perform various functions related to the generation of notifications as described below. In some examples, the memory 174 can store the repository 166.

Figure 2:
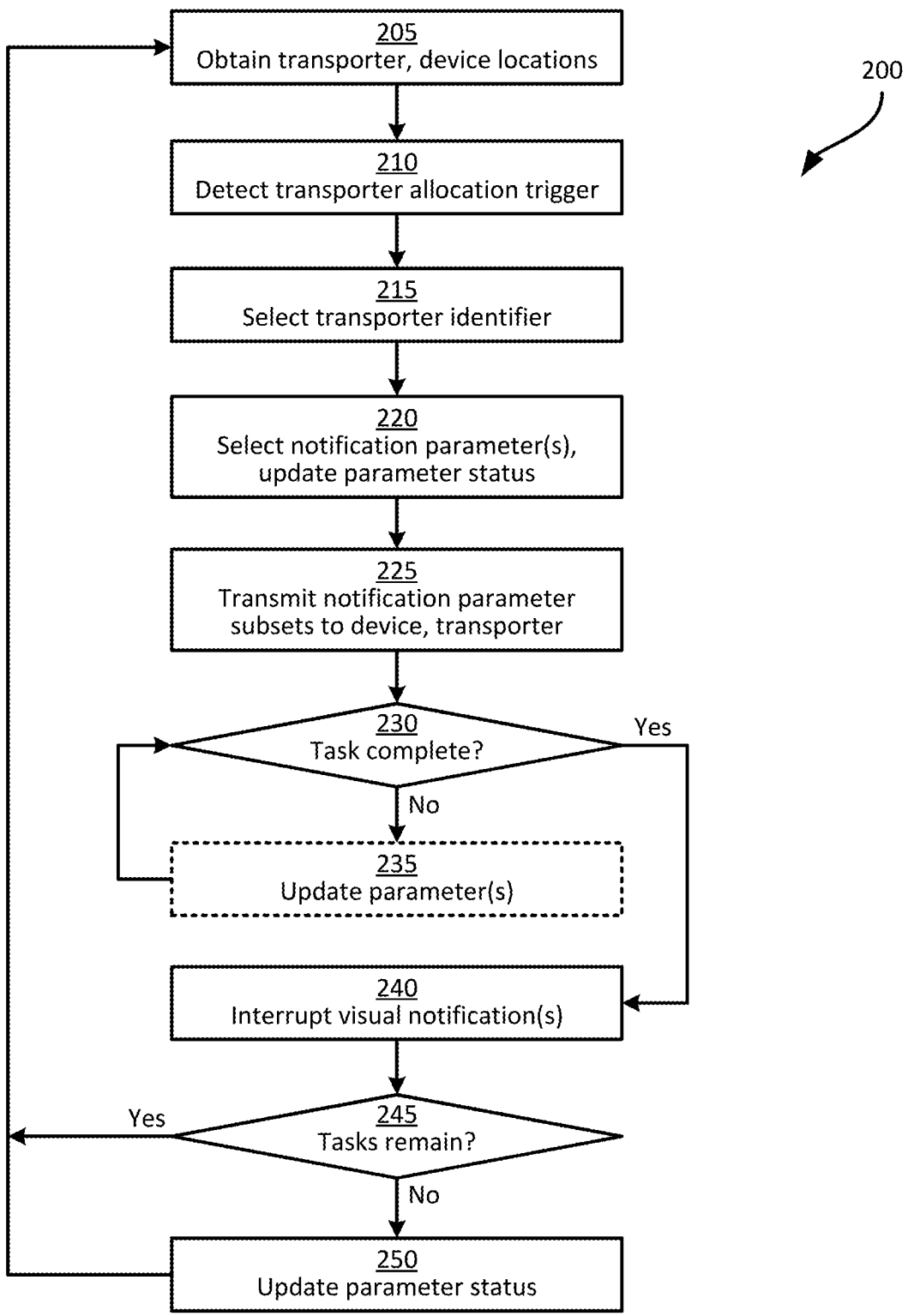
FIG. 2 is a flowchart of a method of dynamically bonding and notifying users and transporters in the system of FIG. 1.

Turning to FIG. 2, a method 200 of dynamically bonding users 128 with transporters 130, and visually notifying the users 128 of such bonds, is illustrated. The blocks of the method 200 are discussed below in conjunction with their example performance in the system 100, although it is contemplated that the method 200 can also be performed in other suitable systems. The blocks of the method 200 are performed by the server 136, but certain blocks may also be performed by the devices 134 and/or the transporters 130, as noted below.

At block 205, the server 136 is configured to obtain the locations of at least the transporters 130 in the coordinate system 140. The server 136 can also obtain the locations of the devices 134 at block 205. The performance of block 205 can be repeated periodically throughout the performance of the method 200, at any suitable frequency. In some examples, the location of each transporter 130 and/or device 134 can be obtained about once every fifteen seconds. In other examples, the server 136 can obtain locations at higher or lower frequencies, or at variable frequencies. As noted earlier, various mechanisms can be employed by the server 136 to obtain the locations. For example, each transporter 130 and each device 134 can be configured to determine its own location (e.g., by processing signals from the emitters 142, collecting data via the previously mentioned motion sensors, or the like), and report the location to the server 136.

At block 210, the server 136 is configured to detect a transporter allocation trigger. In general, the trigger detected at block 210 is an event indicating that a user 128 needs a transporter 130 allocated thereto, e.g., to deposit a picked item 108 to that transporter 130. In some examples, the server 136 detects the trigger at block 210 by receiving an item identifier from a device 134. For example, users 128 can be assigned pick tasks, either by the server 136 or by another device. Each pick task can include an item identifier such as a universal product code (UPC) or the like, as well as a location in the facility where the corresponding item 108 is placed. Each pick task can also include information such as a quantity of the item 108. The pick tasks assigned to a user 128 can be stored on the corresponding device 134 and presented to the user 128 via a display. Upon retrieving an item 108 identified in a pick task, the user 128 can operate the device 134 to generate a message (e.g., to the server 136) indicating retrieval of the item 108. The message can be generated by capturing and decoding a machine-readable indicium (e.g., a barcode) disposed on the support structure 104 or the item 108 itself, and sending the data decoded therefrom to the server 136. Receipt of the above-mentioned message at the server 136 indicates that the user 128 has retrieved the item 108 and now requires instruction indicating a transporter 130 to place the item 108 on.

The trigger detection at block 210 includes the receipt of a device identifier at the server 136, identifying a specific one of the devices 134. The device identifier can be an account name corresponding to the user 128, a serial number, a network identifier (e.g., a media access control (MAC) address), or the like.

Figure 3:
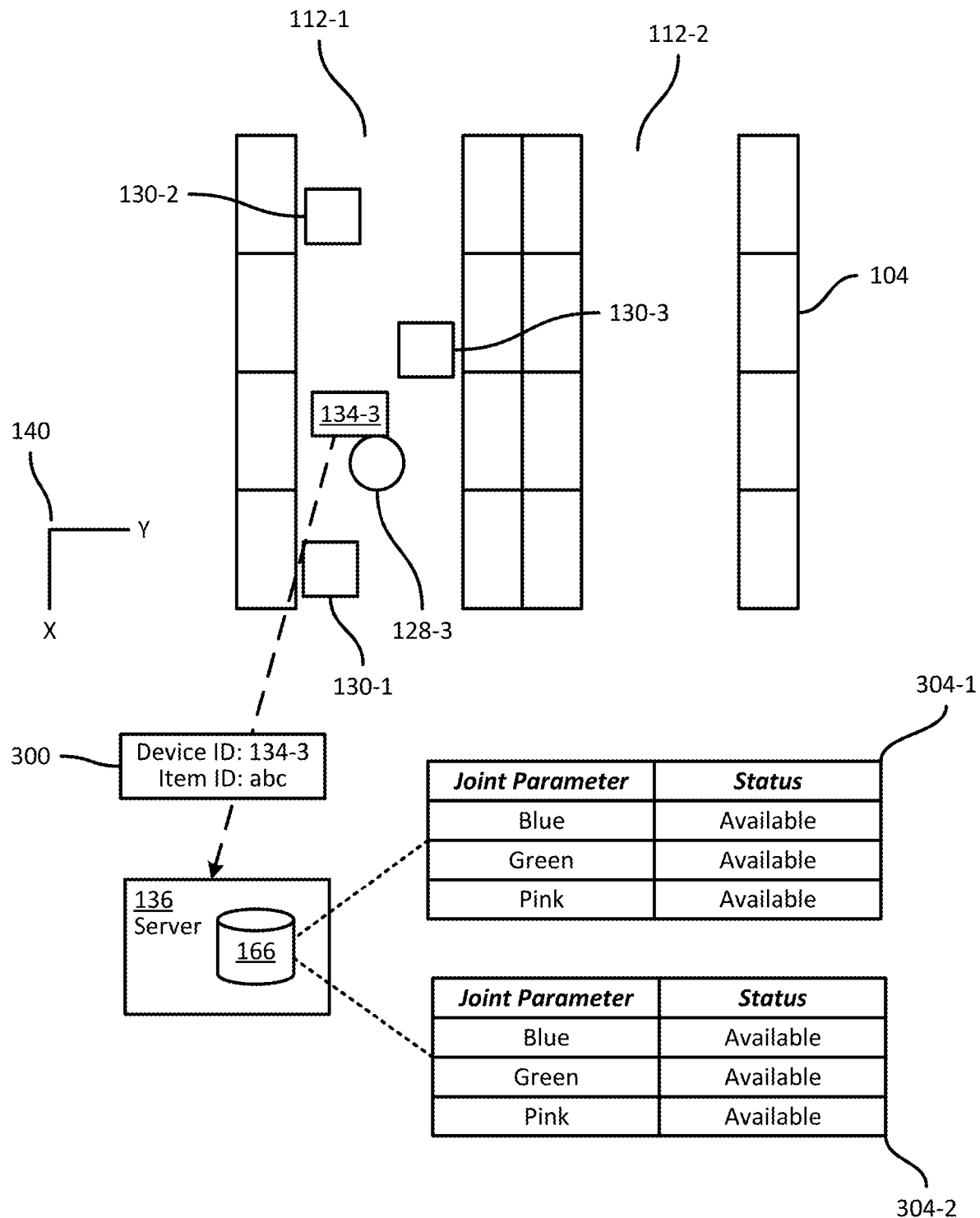
FIG. 3 is a diagram illustrating an example performance of blocks 205 and 210 of the method of FIG. 2.

FIG. 3 illustrates an overhead view of the facility shown in FIG. 1, with the locations of three transporters 130-1, 130-2, and 130-3 shown in the aisle 112-1, as well as the user 128-3 (and the corresponding device 134-3). The device 134-3 sends, e.g., in response to scanning of an item 108, a message 300 to the server 136 containing the item identifier ("abc") and the device identifier ("134-3"). Receipt of the message 300 at the server 136 constitutes detection of a trigger at block 210. The server 136 can obtain the location of the device 134-3 at block 205 as noted above via the location tracking subsystem. In some examples, the server 136 can instead infer a location of the device 134-3 from the item identifier in the message 300. That is, the server 136 can retrieve a location of the corresponding item from the repository 166, and use the retrieved item location as the location of the device 134-3, on the assumption that the device 134-3 is at or close to the location from which the item 108 was retrieved from a support structure 104.

Returning to FIG. 2, at block 215 the server 136 is configured to select a transporter identifier, corresponding to a particular transporter 130. Selection of a transporter 130 at block 215 temporarily allocates that transporter 130 to the user 128-3. The user 128-3 is therefore expected to deposit the picked item 108 into a tote or other receptacle of the selected transporter 130. The selection of a transporter 130 at block 215 can be based on any of a variety of factors, including proximity between the device 134-3 and the transporters 130, other active task assignments for the transporters 130, and the like. In the present example, it is assumed that the server 136 selects the transporter 130-2 at block 215. For instance, the transporters 130-1 and 130-3 may have other active tasks, while the transporter 130-2 may currently be idle. Further, all three transporters 130 may be within a predefined proximity threshold.

At block 220, the server 136 is configured to select at least one joint notification parameter. As will be apparent in the discussion below, the joint notification parameter enables both the device 134-3 and the transporter 130-2 to generate synchronized visual notifications to assist the user 128-3 in distinguishing the transporter 130-2 from other transporters 130 in the field of view of the user 128-3. The visual notifications are synchronized in that they are generated simultaneously, or at least for overlapping time periods, and have at least one visual characteristic (e.g. color) in common.

The joint notification parameter(s) selected at block 220 are selected from a predefined set of joint notification parameters maintained in the repository 166. For example, FIG. 3 illustrates sets 304-1 and 304-2 of joint notification parameters. The sets 304 correspond to distinct regions in the facility. In the illustrated example, the set 304-1 corresponds to the aisle 112-1, and the set 304-2 corresponds to the aisle 112-2. As will be discussed below, the server 136 selects joint notification parameters to avoid the generation of duplicate visual notifications by more than one transporter 130. With the use of distinct sets of notification parameters, the server 136 can avoid such duplication within each region, while permitting duplication between regions, as the different regions are typically not visible simultaneously by the users 128. The management of notification parameters on a per-region basis can allow the use of a smaller number of joint notification parameters within each region, which may enable the generation of visual notifications with greater contrast between each other.

As seen in FIG. 3, each set 304 includes three joint notification parameters, in the form of illumination colors (blue, green, and pink in the illustrated example). Other colors, and/or additional colors, can be used in other examples. Some joint notification parameters can also include combinations of colors, to generate visual notifications that alternate between first and second colors, for example. Each joint notification parameter is stored in association with a status indicator, indicating whether the joint notification parameter is available to be assigned to a transporter 130, or whether the joint notification parameter is unavailable (i.e. already in use to generate a visual notification). As shown in FIG. 3, all joint notification parameters are currently available (i.e., none of the transporters 130 are generating visual notifications).

The server 136 is configured to select a joint notification parameter from the subset of parameters with available status. The selection can be made at random from that subset, or according to a priority sequence, such as the order in which the parameters are listed in the relevant set 304. In this performance of block 215, for example, the server 136 can be configured to select the first available parameter, which is the color blue. In other examples, the server 136 can base the selection of joint notification parameters on other factors, such as an identifier of a customer associated with the pick task (e.g., the server 136 can store a preferred color in connection with a customer identifier).

The server 136 can also select other joint notification parameters at block 220, in addition to the illumination color shown in FIG. 3. The color, for example, may be selected as a primary joint notification parameter, and the server 136 can also select secondary parameters such as an illumination intensity, a pattern and/or frequency of flashing, and the like. In some examples, the secondary parameters do not have status indicators themselves, and can therefore be re-used across different transporters 130. That is, two distinct transporters 130 can generate a visual notification at the same intensity, so long as different colors are used. In further examples, however, certain other parameters such as frequency and/or pattern of flashing can have status indicators. In such examples, therefore, the combination of color and pattern/frequency is considered a primary parameter, and has a status indicator. Such examples are discussed further below.

Also at block 220, the server 136 is configured to update the status of the selected joint notification parameters, to indicate that such parameters are in use. The result of the updated status is to indicate that the selected parameters are unavailable, and therefore will not be selected for subsequent allocations until released (i.e., returned to an available status).

At block 225, the server 136 is configured to send the selected joint notification parameter(s) to both the transporter 130 selected at block 215, and the device 134-3 associated with the trigger detected at block 210. In some examples, e.g., the performance of blocks 205, 210, 215, 220, and 225 can be performed by one or more of the devices 134, rather than by the server 136.

Figure 4:
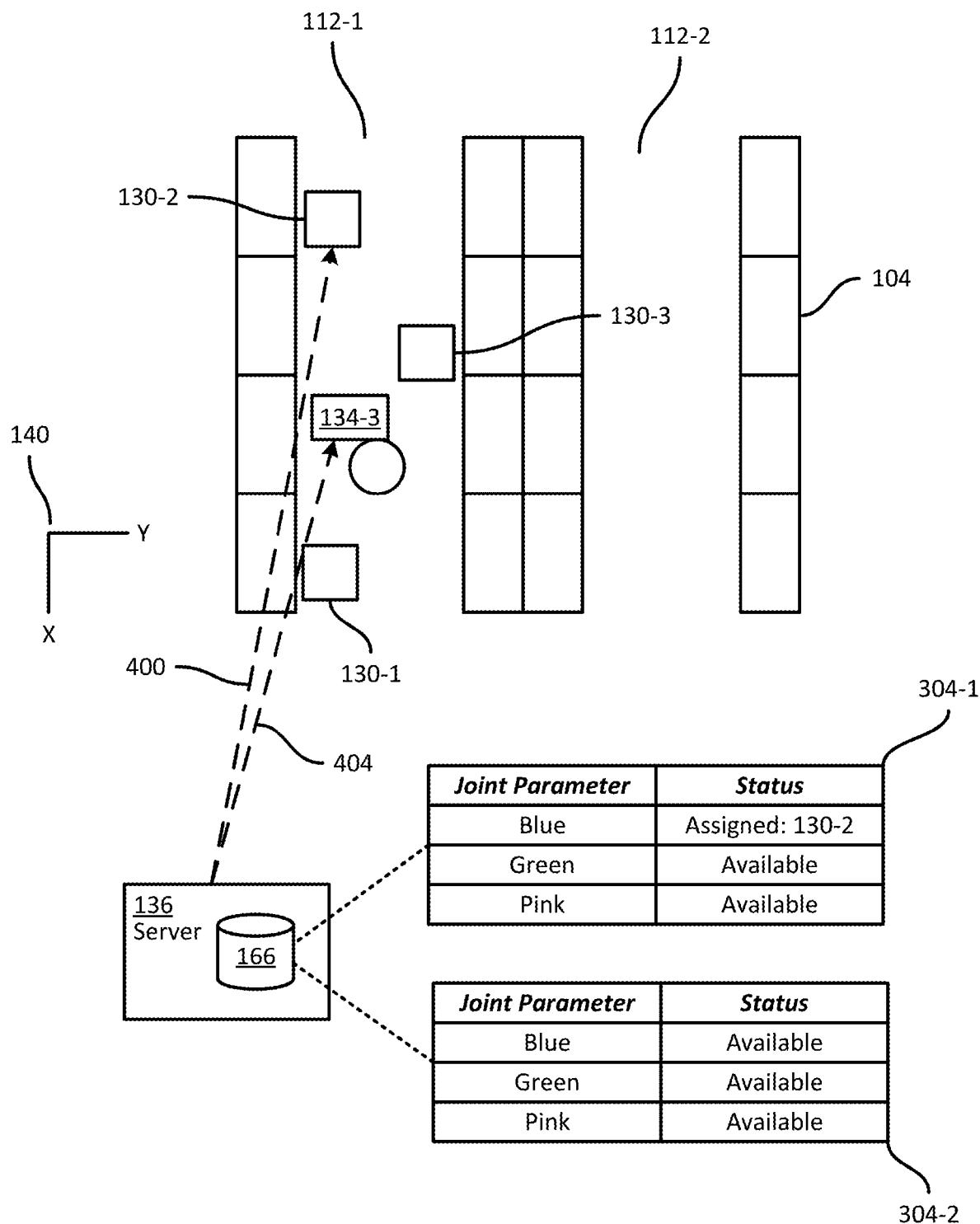
FIG. 4 is a diagram illustrating an example performance of blocks 215 to 225 of the method of FIG. 2.

Turning to FIG. 4, at block 225 the server 136 sends a message 400 to the transporter 130-2, and a message 404 to the device 134-3. Each of the messages 400 and 404 includes at least the joint notification parameter (e.g., an identifier of the color blue) selected at block 220. The messages 400 and 404 can also include other information. For example, the message 404 can include an identifier of a particular one of the totes on the transporter 130-2 to which the item 108 should be deposited, for display to the user 128-3. As a further example, the message 404 can include an identifier of the transporter 130-2, e.g. corresponding to an identifier displayed on a nameplate visible on the chassis of the transporter 130-2, a display mounted on the transporter, or the like.

As also shown in FIG. 4, the status of the selected joint notification parameter in the repository 166 has been updated. Specifically, the color blue for the aisle 112-1 is no longer indicated as being available, but instead is shown as having been assigned to the transporter 130-2. The color blue, in other words, is unavailable for assignment to other transporters 130 within the aisle 112-1. Transporters 130 in the aisle 112-2, however, may still be assigned any of the colors in the set 304-2, including blue.

Figure 5:
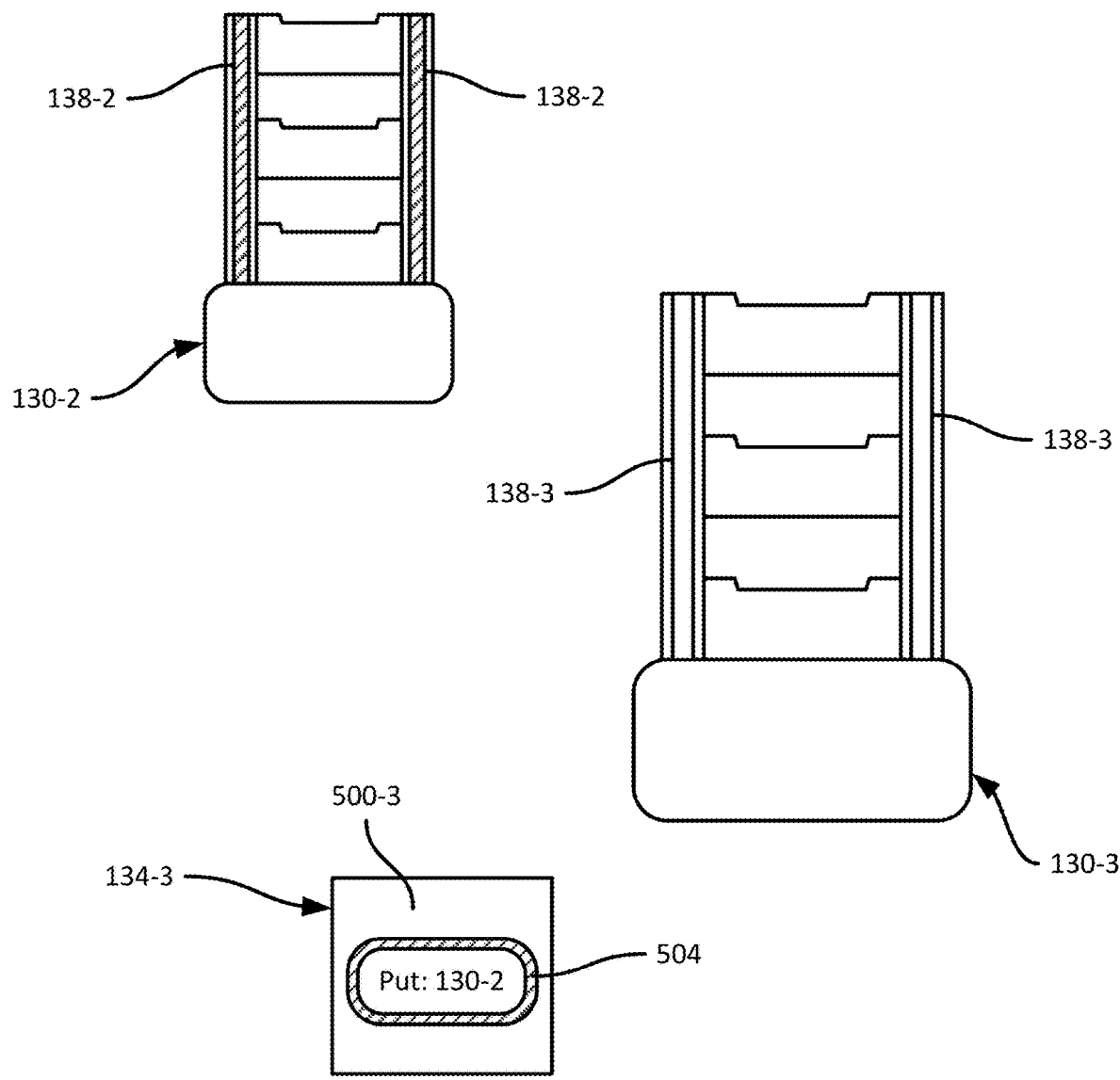
FIG. 5 is a diagram illustrating synchronized visual notifications generated by a transporter and a mobile device in the system of FIG. 1.

Following receipt of the joint notification parameter(s), each of the device 134-3 and the transporter 130-2 are configured to generate synchronized visual notifications according to the joint notification parameter(s). For example, FIG. 5 illustrates the field of view of the user 128-3, looking along the aisle 112-1. The transporters 130-3 and 130-2 are visible. The transporter 130-2 controls the light strips 138-2 to illuminate in the color selected by the server 136 at block 220 (e.g., blue in this example). The device 134-3, meanwhile, controls a display 500-3 thereof to present a visual notification such as a blue-colored border 504 around an instruction identifying the transporter 130-2. The instruction can include other information in addition to or instead of the transporter identifier, such as the item identifier, the expected quantity of the item 108 to be deposited, and the like. A wide variety of other visual notifications can also be generated on the display 500-3, such as a background to the instruction, and the like.

Referring again to FIG. 2, at block 230 the server 136 is configured to determine whether the pick task whose initiation was detected at block 210 is complete. Completion of the pick task includes, for example, depositing the item 108 identified in the message 300 in a receptacle of the transporter 130-2. Detection of task completion can be performed in a variety of ways. For example, the server 136 can receive a further message from the device 134-3 indicating such completion, e.g., in response to the user 128-3 selecting an input at the device 134-3 upon depositing the item 108. In other examples, the server 136 can receive a further message from the transporter 130-2 indicating detection of the item 108 (e.g., via scales, RFID readers, or other sensors disposed on the transporter 130-2).

When the task is not yet complete (i.e., the determination at block 230 is negative), the server 136 can repeat the determination of block 230, awaiting completion of the task. As will be apparent, during such time the server 136 can also perform further instances of blocks 210-225, to allocate transporters 130 to other users 128/devices 134.

Optionally, as shown in dashed lines in FIG. 2, at block 235 the server 136 can update the joint notification parameters selected at block 220 when the task is not yet complete. Updating the joint notification parameters typically does not involve changing the primary parameter (e.g. illumination color), but can include adjusting secondary parameters such as intensity, frequency and/or pattern of flashing, and the like. For example, based on the current locations of the device 134-3 and the transporter 130-2, the server 136 can determine a proximity of the device 134-3 to the transporter 130-2 (e.g., a distance separating the device 134-3 and the transporter 130-2). Notification parameters such as illumination intensity can be adjusted based on such proximity. In some examples, the server 136 can increase or decrease illumination intensity as the user 128-3 (and therefore the device 134-3) approaches the transporter 130-2. The resulting visual notifications therefore vary perceptibly to the user 128-3, indicating whether the user 128-3 is approaching the correct transporter 130.

Adjustments made at block 235 can be based on a time period as well as, or instead of, proximity as mentioned above. For example, the server 136 can maintain a time threshold (e.g., thirty seconds, although shorter and longer thresholds may also be used), and if the time elapsed since the notification parameters were sent at block 225 exceeds the threshold without the task being completed, the server 136 can adjust one or more notification parameters as set out above, on the assumption that the user 128-3 may be having difficulty in locating the transporter 130-2. Various other information can also be provided to the device 134-3 at block 235. For example, the server 136 can send a map or partial map of the facility to the device 134-3, illustrating the current locations of the device 134-3 and the transporter 130-2.

Figure 6:
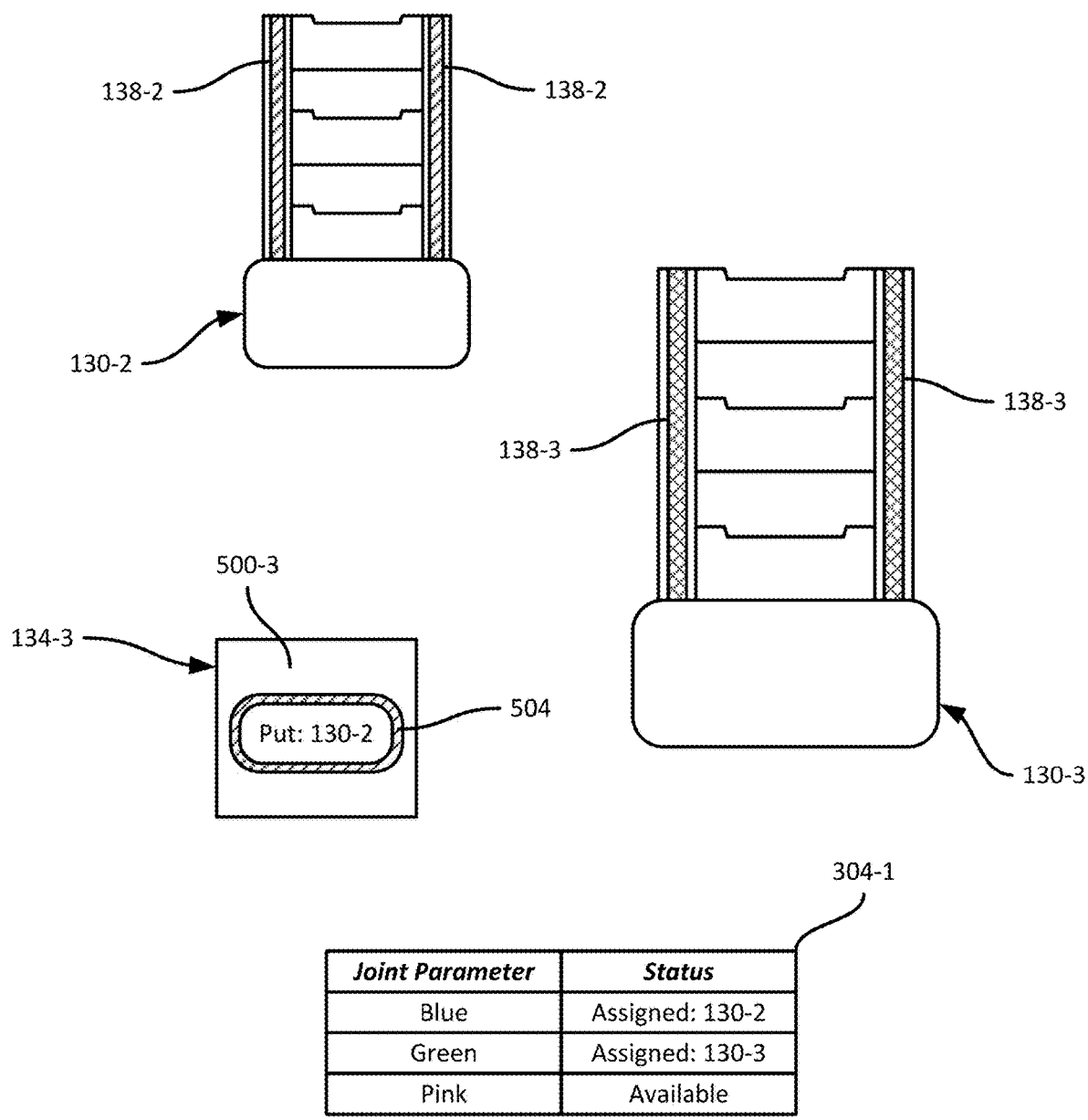
FIG. 6 is a diagram illustrating further synchronized visual notifications generated by a transporter and a mobile device in the system of FIG. 1.

As noted above, subsequent triggers detected at block 210 may lead to the selection of additional transporters 130. If the transporter 130-2 is still generating a visual notification according to the parameters sent at block 225, the server 136 selects other joint notification parameters (i.e., distinct from the notification parameters provided to the transporter 130-2) for such additional transporters. For example, referring to FIG. 6, the transporter 130-2 and device 134-3 are shown as in FIG. 5. The transporter 130-3, however, has been selected in another instance of block 215. Because the color blue was unavailable, the server 136 has selected the color green for provision to the transporter 130-3 (and another device 134-3, not shown in FIG. 6). Both the colors blue and green are therefore indicated as being unavailable in the set 304-1.

Returning to FIG. 2, when the determination at block 230 is affirmative, indicating that the item 108 has been deposited in the transporter 130-2 by the user 128-3, performance of the method 200 proceeds to block 240. At block 240, the visual notifications generated by either or both of the device 134-3 and the transporter 130-2 are interrupted. In some examples, the interruption is achieved via the transmission of an instruction to cease generating visual notifications from the server 136 to the device 134-3 and/or the transporter 130-2. In other examples, e.g., when the device 134-3 receives input from the user 128-3 that the task is complete, the device 134-3 itself can perform block 240.

The device 134-3 and the transporter 130-2 do not necessarily cease generating visual notifications at the same time. For example, the device 134-3 may interrupt the generation of a visual notification at the display 500-3 immediately upon completion of the task, while the transporter 130-2 may continue to generate a visual notification, e.g., if another device 134 has also been temporarily bonded with the transporter 130-2 and the corresponding task is not yet complete.

At block 245, the server 136 is configured to determine whether tasks allocated to the transporter 130-2 remain active (i.e., not yet completed). The server 136 can maintain, e.g., in the repository 166, a list of active tasks for each transporter 130-2, each record in the list including a device identifier, an item identifier, or the like. When the determination at block 245 is affirmative, the server 136 can continue monitoring transporter and device locations and allocating further tasks as discussed above. The joint notification parameters selected at block 220, however, remain unavailable for allocation to other transporters 130, as noted above.

Figure 7:
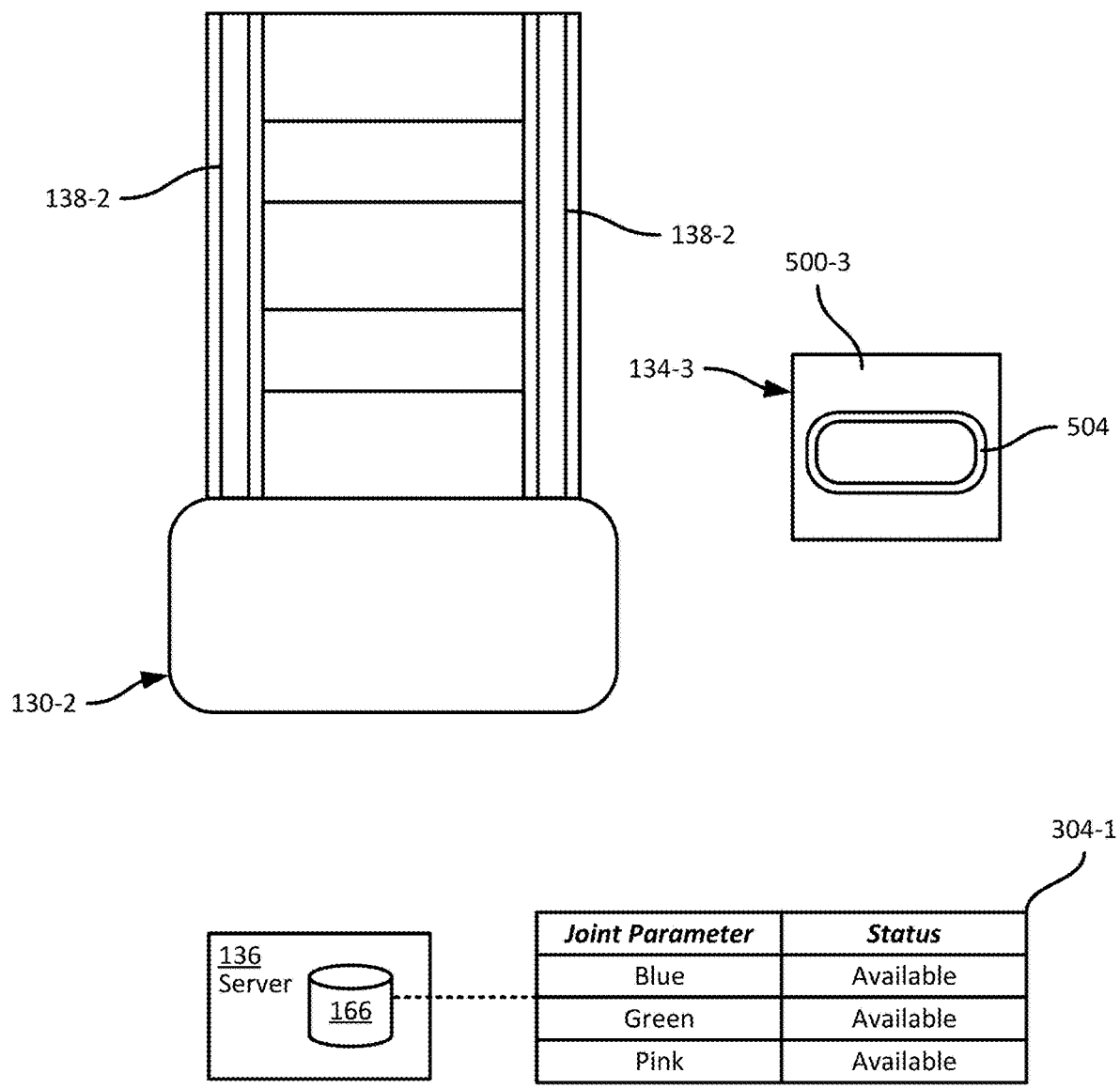
FIG. 7 is a diagram illustrating an example performance of blocks 240 and 250 of the method of FIG. 2.

When the determination at block 245 is negative, at block 250 the server 136 is configured to update the status of the joint notification parameters selected at block 220. In particular, the server 136 releases those joint notification parameters, returning the status of the color blue to available from unavailable. As seen in FIG. 7, after the completion of the task (and assuming no further tasks are currently assigned to the transporter 130-2), neither the transporter 130-2 nor the device 134-3 generate the above-mentioned visual notifications, and the set 304-1 of joint notification parameters for the aisle 112-1 is updated to indicate that the color blue is once again available.

Figure 8:
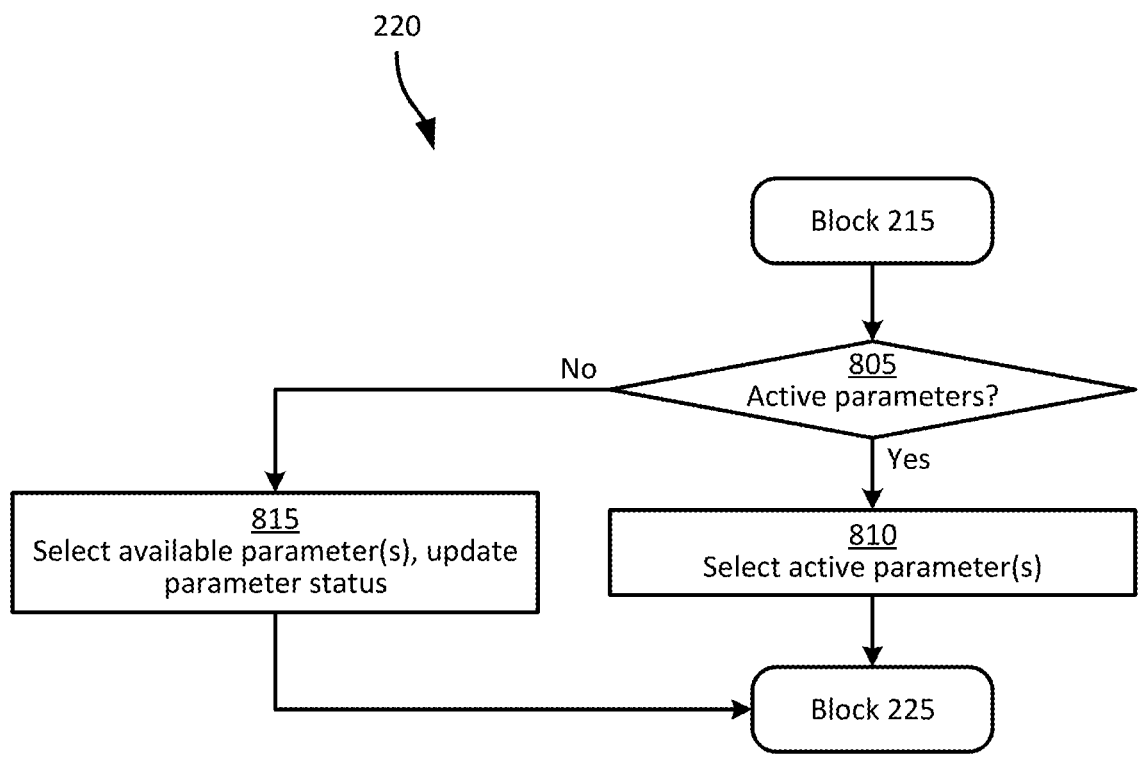
FIG. 8 is a flowchart of a method of performing block 220 of the method of FIG. 2.

As will be apparent to those skilled in the art, multiple tasks may be assigned to the same transporter 130. That is, distinct triggers can be detected via instances of block 210, such that more than one task is outstanding for a given transporter 130 at the same time. To avoid selecting conflicting joint notification parameters for a single transporter 130, the server 136 therefore also determines, at block 220, whether the relevant transporter 130 has already been assigned notification parameters. Turning to FIG. 8, a more detailed illustration of block 220 is shown. In particular, at block 805, the server 136 is configured to determine whether the relevant transporter 130 (e.g., the transporter 130-2 in the examples discussed above) has active notification parameters. As shown in FIG. 4, once notification parameters have been selected for a transporter 130, the status of such parameters can be updated to include a transporter identifier. At block 805, therefore, the server 136 determines whether the identifier of the transporter selected at block 215 already appears in the relevant set 304 of joint notification parameters.

When the determination at block 805 is affirmative, the server 136 proceeds to block 810. At block 810, instead of selecting available notification parameters (i.e., having not been assigned to any transporters 130), the server 136 simply selects the notification parameters already assigned to the relevant transporter 130. Multiple devices 134 may therefore generate similar visual notifications (e.g. with the same color) if such devices are temporarily bonded to the same transporter 130 at overlapping times.

When the determination at block 805 is negative, on the other hand, the server 136 proceeds to block 815, to select notification parameters randomly, based on a priority sequence, or the like, as described above.

Figure 9:
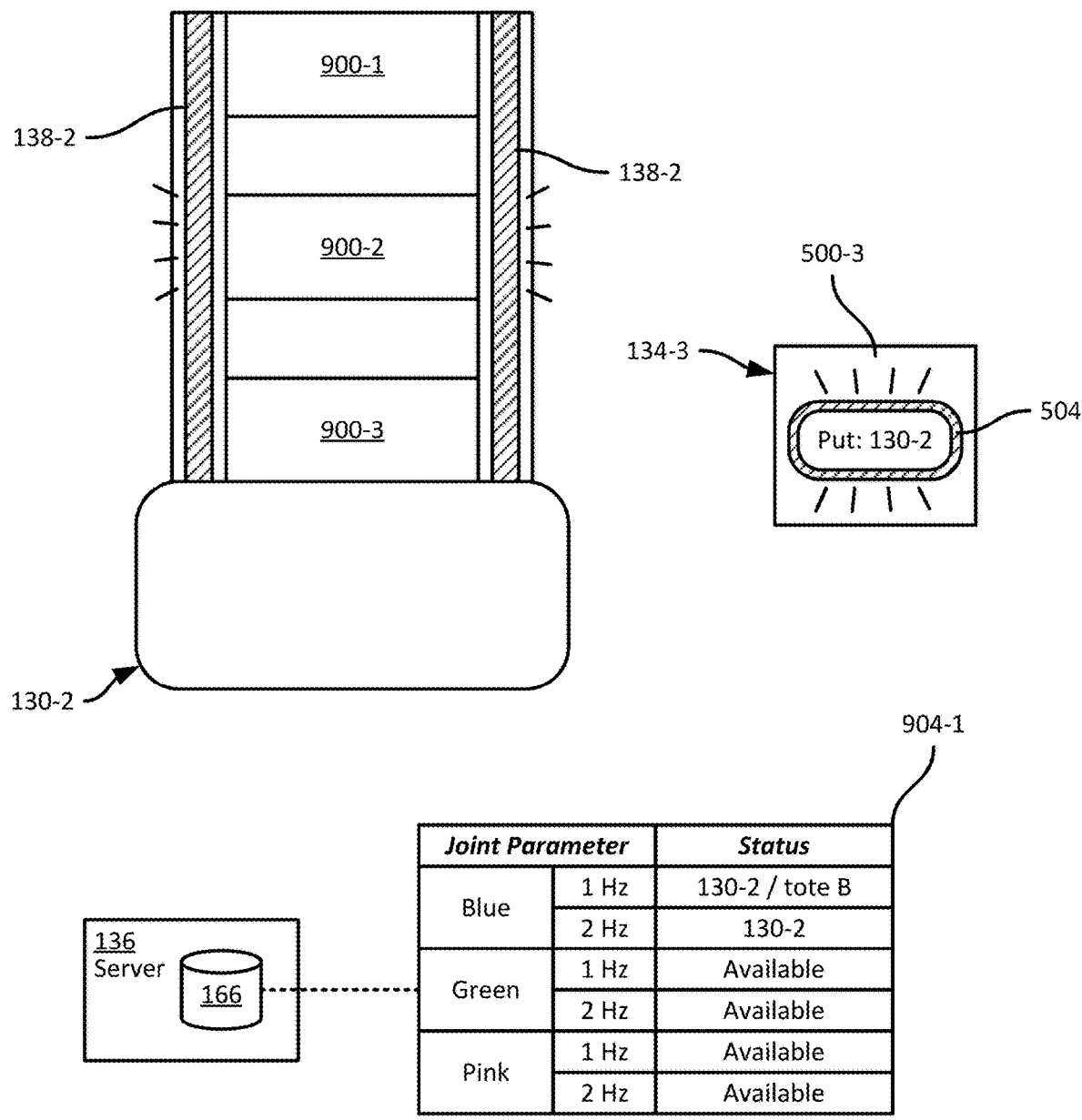
FIG. 9 is a diagram illustrating additional example visual notifications generated via performance of the method of FIG. 2.

A wide variety of other arrangements of notification parameters are also contemplated. Turning to FIG. 9, for example, in some examples the joint notification parameters can include a flashing frequency and/or pattern associated with a specific tote of the transporter 130. For instance, the transporter 130-2 as illustrated includes three totes 900-1, 900-2, and 900-3. The server 136 can select a particular tote 900 (e.g., the tote 900-2) at block 215. Further, the joint notification parameters selected at block 220 can include a frequency at which illumination is to be flashed in association with the tote 900-2. Following transmission of the notification parameters to the device 134-3 and the transporter 130-2, the device 134-3 controls the display 500-3 to flash the border 504 at the selected frequency, and in the selected color. The transporter 130-2, meanwhile, can control the entire length of the strips 138-2 to illuminate in the selected color, and a specific portion of each strip 138-2 adjacent to the tote 900-2 to flash at the selected frequency. The visual notification therefore guides the user 128-3 to the tote 900-2 itself.

When the frequency parameter is employed to distinguish between totes 900 as set out above, the server 136 can associate status indicators with frequency as well as color. For example, the set 904-1 of joint notification parameters associated with the aisle 112-1 can include distinct frequencies for each color. A color is allocated to a single transporter 130, and a frequency is allocated to an individual tote 900 on that transporter 130. Thus, the color blue will not be allocated to other transporters 130 in the aisle 112-1, and a frequency of one hertz will not be allocated to the tote 900-1 or the tote 900-3. Additional frequencies may also be configured beyond the two examples shown in FIG. 9.

Variations to the above systems and methods are contemplated. For example, in some implementations the notification parameters sent at block 225 can be accompanied by network identifiers or other identifying information of the device 134 and the transporter (e.g., MAC addresses or the like). The transporter 130 and the device 134 can use such information to establish a short-range communications link (e.g., a Bluetooth link) therebetween, which can be employed to assess proximity between the transporter 130 and the device 134. The transporter 130 and the device 134 can therefore perform the adjustment of notification parameters discussed in connection with block 235 directly, without instruction from the server 136.

In further embodiments, the notification parameters provided to the transporters 130 can cause the transporters 130 to generate visual notifications as described above, while the notification parameters provided to the devices 134 can cause the devices 134 to generate notifications that correspond to, but need not be the same as, the visual notifications. For example, notification parameters provided to both a transporter 130 and a device 134 can specify an illumination color. The device 134, however, may generate an audible notification (instead of, or in addition to a visual notification) indicating the color, e.g. via text-to-speech.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method comprising:
    detecting a transporter allocation trigger associated with a mobile computing device disposed in a facility;
    in response to detecting the transporter allocation trigger, selecting a transporter identifier of an autonomous transporter robot disposed in the facility, the autonomous transported robot including: (a) a locomotion assembly powered by an electric motor, (b) one or more navigational sensors configured for autonomous navigation of the facility via the locomotion assembly, and (c) one or more light emitters;
    selecting a joint notification parameter;
    causing the mobile computing device to generate a notification according to the joint notification parameter;
    transmitting the joint notification parameter to the autonomous transporter robot to cause the autonomous transporter robot to activate the one or more light emitters and generate a visual notification corresponding to the notification generated by the mobile computing device, the autonomous transporter robot generating the visual notification via the one or more light emitters as the autonomous transporter robot navigates the facility via the one or more navigational sensors;
    detecting an update condition based on at least one of (i) locations of the autonomous transporter robot and the mobile computing device, and (ii) a time threshold; and
    in response to detecting the update condition, transmitting an adjusted joint notification parameter to at least one of the mobile computing device and the autonomous transporter robot.

2. The method of claim 1, further comprising:
    obtaining locations of the mobile computing device and the autonomous transporter robot within the facility; and
    selecting the transporter identifier based on the locations.

3. The method of claim 1, wherein detecting the transportation allocation trigger includes receiving an item identifier from the mobile computing device.

4. The method of claim 1, further comprising:
storing (i) a set of joint notification parameters, and (ii) a status for each joint notification parameter in the set;
in response to selecting the joint notification parameter, updating the status of the joint notification parameter from available to unavailable.

5. The method of claim 4, further comprising:
detecting a further transporter allocation trigger;
selecting a further transporter identifier of a further autonomous transporter robot; and
selecting a further joint notification parameter from the set, the further joint notification parameter having an available status.

6. The method of claim 4, further comprising:
in response to transmitting the joint notification parameter, determining that a task associated with the transporter allocation trigger is complete; and
in response to determining that the task is complete, updating the status of the joint notification parameter from unavailable to available.

7. The method of claim 4, further comprising:
storing, for each joint notification parameter in the set, a distinct status for each of a plurality of regions in the facility;
determining a region associated with the transporter allocation trigger; and
updating the status of the joint notification parameter for the determined region.

8. The method of claim 1, further comprising:
prior to detecting completion of a task associated with the transporter allocation trigger, detecting a further transporter allocation trigger associated with a further mobile computing device;
selecting the transporter identifier; and
transmitting the joint notification parameter to the further mobile computing device.

9. The method of claim 1, wherein the joint notification parameter includes at least one of:
an illumination color;
an illumination intensity;
a flashing frequency;
a flashing pattern; or
a tote identifier of the autonomous transporter robot.

10. The method of claim 1, wherein causing the mobile computing device to generate a notification includes sending the joint notification parameter to the mobile computing device.

11. A server, comprising:
a communications interface, and a processor connected with the communications interface, the processor configured to:
detect a transporter allocation trigger associated with a mobile computing device disposed in a facility;
in response to detecting the transporter allocation trigger, select a transporter identifier of an autonomous transporter robot disposed in the facility, the autonomous transported robot including: (a) a locomotion assembly powered by an electric motor, (b) one or more navigational sensors configured for autonomous navigation of the facility via the locomotion assembly, and (c) one or more light emitters;
select a joint notification parameter;
transmit the joint notification parameter to the mobile computing device, to cause the mobile computing device to generate a first visual notification according to the joint notification parameter;
transmit the joint notification parameter to the autonomous transporter robot, to cause the autonomous transporter robot to activate the one or more light emitters and generate a second visual notification synchronized with the first visual notification, according to the joint notification parameter, the autonomous transporter robot generating the second visual notification via the one or more light emitters as the autonomous transporter robot navigates the facility via the one or more navigational sensors;
detect an update condition based at least on one of (i) locations of the autonomous transporter robot and the mobile computing device, and (ii) a time threshold; and
in response to detecting the update condition, transmit an adjusted joint notification parameter to at least one of the mobile computing device and the transporter.

12. The server of claim 11, wherein the processor is further configured to:
obtain locations of the mobile computing device and the autonomous transporter robot within the facility; and
select the transporter identifier based on the locations.

13. The server of claim 11, wherein to detect the transportation allocation trigger, the processor is configured to receive an item identifier from the mobile computing device.

14. The server of claim 11, wherein the processor is further configured to:
store (i) a set of joint notification parameters, and (ii) a status for each joint notification parameter in the set;
in response to selecting the joint notification parameter, update the status of the joint notification parameter from available to unavailable.

15. The server of claim 14, wherein the processor is further configured to:
detect a further transporter allocation trigger;
select a further transporter identifier of a further autonomous transporter robot; and
select a further joint notification parameter from the set, the further joint notification parameter having an available status.

16. The server of claim 14, wherein the processor is further configured to:
in response to transmitting the joint notification parameter, determine that a task associated with the transporter allocation trigger is complete; and
in response to determining that the task is complete, update the status of the joint notification parameter from unavailable to available.

17. The server of claim 14, wherein the processor is further configured to:
store, for each joint notification parameter in the set, a distinct status for each of a plurality of regions in the facility;
determine a region associated with the transporter allocation trigger; and
update the status of the joint notification parameter for the determined region.

18. The server of claim 11, wherein the processor is further configured to:
prior to detecting completion of a task associated with the transporter allocation trigger, detect a further transporter allocation trigger associated with a further mobile computing device;
select the transporter identifier; and
transmit the joint notification parameter to the further mobile computing device.

19. The server of claim 11, wherein the joint notification parameter includes at least one of:
- an illumination color;
- an illumination intensity;
- a flashing frequency; or
- a tote identifier of the transporter.

20. A mobile computing device, comprising:
- an output assembly;
- a communications interface; and
- a processor connected with the output assembly and the communications interface, the processor configured to:
  - detect a transporter allocation trigger;
  - in response to detecting the transporter allocation trigger, select a transporter identifier of an autonomous transporter robot disposed in a facility, the autonomous transported robot including: (a) a locomotion assembly powered by an electric motor, (b) one or more navigational sensors configured for autonomous navigation of the facility via the locomotion assembly, and (c) one or more light emitters;
  - select a joint notification parameter;
  - generate a notification according to the joint notification parameter;
  - transmit the joint notification parameter to the autonomous transporter robot, to cause the autonomous transporter robot to activate the one or more light emitters and generate a visual notification corresponding to the notification generated by the mobile computing device, the autonomous transporter robot generating the visual notification via the one or more light emitters as the autonomous transporter robot navigates the facility via the one or more navigational sensors;
  - detect an update condition based on at least one of (i) locations of the autonomous transporter robot and the mobile computing device, and (ii) a time threshold; and
  - in response to detecting the update condition, transmit an adjusted joint notification parameter to at least one of the mobile computing device and the autonomous transporter robot.

* * * * *